US011828262B2

(12) United States Patent
Möller et al.

(10) Patent No.: US 11,828,262 B2
(45) Date of Patent: Nov. 28, 2023

(54) ROTOR BLADE AND WIND TURBINE

(71) Applicant: Wobben Properties GmbH, Aurich (DE)

(72) Inventors: Christian Möller, Aurich (DE); Hauke Maass, Aarhus (DK); Jochen Stemberg, Aurich (DE)

(73) Assignee: Wobben Properties GmbH, Aurich (DE)

( * ) Notice: Subject to any disclaimer, the term of this patent is extended or adjusted under 35 U.S.C. 154(b) by 138 days.

(21) Appl. No.: 17/626,384

(22) PCT Filed: Jul. 8, 2020

(86) PCT No.: PCT/EP2020/069269
§ 371 (c)(1),
(2) Date: Jan. 11, 2022

(87) PCT Pub. No.: WO2021/008972
PCT Pub. Date: Jan. 21, 2021

(65) Prior Publication Data
US 2022/0252044 A1  Aug. 11, 2022

(30) Foreign Application Priority Data
Jul. 12, 2019  (DE) .................... 10 2019 119 027.4

(51) Int. Cl.
*F03D 1/06* (2006.01)
(52) U.S. Cl.
CPC ......... *F03D 1/0641* (2013.01); *F03D 1/0675* (2013.01); *F05B 2240/301* (2013.01)

(58) Field of Classification Search
CPC . F03D 1/0641; F03D 1/0683; F05B 2240/301
USPC ...................................... 416/223 R
See application file for complete search history.

(56) References Cited

U.S. PATENT DOCUMENTS

| 8,814,525 | B2 | 8/2014 | Petsche et al. |
| 9,759,185 | B2 * | 9/2017 | Bohlen ................. F03D 13/10 |
| 9,932,960 | B2 | 4/2018 | Petsche et al. |

(Continued)

FOREIGN PATENT DOCUMENTS

| DE | 102008052858 A1 | 4/2010 |
| DE | 202013004881 U1 | 8/2013 |

(Continued)

*Primary Examiner* — Jorge L Leon, Jr.
(74) *Attorney, Agent, or Firm* — SEED INTELLECTUAL PROPERTY LAW GROUP LLP

(57) ABSTRACT

A rotor blade of a wind turbine, to an associated wind turbine and to an associated method. A rotor blade for a wind turbine, which extends in the longitudinal direction with a profile course from a blade connector to a blade tip, wherein the profile course comprises a course of a lift coefficient, comprising a hub portion adjacent to the blade connector and a tip portion adjacent to the blade tip, a middle portion adjacent to the hub portion and to the tip portion, wherein the middle portion substantially comprises those profile sections which have a relative profile thickness, which is defined as the ratio of maximum profile thickness to profile depth, of between 20% and 30%, and wherein the middle portion comprises a local minimum of the course of the lift coefficient.

17 Claims, 3 Drawing Sheets

(56) References Cited

U.S. PATENT DOCUMENTS

| | | | |
|---|---|---|---|
| 2007/0036657 A1* | 2/2007 | Wobben | F03D 1/0641 |
| | | | 416/223 R |
| 2012/0070299 A1 | 3/2012 | Fuglsang et al. | |
| 2012/0280509 A1* | 11/2012 | Fukami | F03D 1/0641 |
| | | | 416/223 R |
| 2013/0272890 A1* | 10/2013 | Fukami | F03D 1/0641 |
| | | | 416/223 R |
| 2015/0064017 A1 | 3/2015 | Bohlen | |
| 2020/0248671 A1 | 8/2020 | Messing et al. | |

FOREIGN PATENT DOCUMENTS

| | | |
|---|---|---|
| DE | 102012206109 B3 | 9/2013 |
| DE | 102013202666 A1 | 8/2014 |
| DE | 102017124861 A1 | 4/2019 |
| EP | 2284389 A2 | 2/2011 |
| EP | 3343024 A1 | 7/2018 |

* cited by examiner

ROTOR BLADE AND WIND TURBINE

BACKGROUND

Technical Field

The invention relates to a rotor blade of a wind turbine, to an associated wind turbine and to an associated method.

Description of the Related Art

Wind turbines are fundamentally known, and they generate electrical power from wind. Modern wind turbines generally concern so-called horizontal-axis wind turbines, in the case of which the rotor axis is arranged substantially horizontally and the rotor blades sweep through a substantially vertical rotor area. Aside from a rotor arranged at a nacelle, wind turbines generally comprise a tower on which the nacelle with the rotor is arranged so as to be rotatable about a substantially vertically oriented axis. The rotor generally comprises one, two or more rotor blades of equal length. The rotor blades have an aerodynamic profile by means of which each rotor blade undergoes a lift force and therefore the rotor is set into a rotational movement by wind.

When designing rotor blades for wind turbines, a compromise has to be found, inter alia, between as large a lift as possible, the air drag and the stability of the rotor blade. It is fundamentally known that a profile of a rotor blade that generates a high lift at low wind speeds generally has a high air drag at higher wind speeds. In addition, aside from the aerodynamic properties of the rotor blade, it is additionally ensured in the construction that the rotor blade satisfies structural requirements, for example withstands a wind pressure during a storm and has a long service life. In particular in the case of low-power turbines having large hub heights and large rotor diameters of currently up to 160 meters, the structural requirements imposed on rotor blades are high. In particular, the arising bending torques in the rotor blade regions in the middle and close to the hub require a particular structural design of the rotor blade such that the arising bending torques and resulting forces can be absorbed and do not lead to failure of the rotor blade. The existing rotor blades provide various advantages, but further improvements are desirable.

The rotor blades of wind turbines are generally produced from so-called profile families. Said profile families are a series of profiles having, for example, a different relative thickness and from which a rotor blade is extended from the blade root, which conventionally has a high relative thickness, as far as the blade tip, which has a low relative thickness. The profiles of such a profile family are generally similar in their properties and optimized as regards geometrical compatibility, with the thickness setback being an important factor. This has the effect that, within a profile family, generally no relatively great changes in the thickness setback occur from one profile to the respective adjacent profile. This results in an approximately constant or monotonous profile of the thickness setback over the radius on a rotor blade.

The German Patent and Trademark Office has searched the following prior art in the priority application relating to the present application: DE 10 2012 206 109 B3, DE 10 2008 052 858 A1, DE 10 2013 202 666 A1, DE 10 2017 124 861 A1, DE 20 2013 004 881 U1, EP 2 284 389 A2, EP 3 343 024 A1.

BRIEF SUMMARY

Provided is a rotor blade of a wind turbine, an associated wind turbine and an associated method that reduce or eliminate one or more of the stated disadvantages. In particular, provided is a rotor blade which permits an improved structural design while at the same time increasing the aerodynamic power.

According to a first aspect, provided is a rotor blade for a wind turbine, which extends in the longitudinal direction with a profile from a blade connector to a blade tip, wherein the profile comprises a course of a lift coefficient, comprising a hub portion adjacent to the blade connector and a tip portion adjacent to the blade tip, a middle portion adjacent to the hub portion and to the tip portion, wherein the middle portion substantially comprises those profile sections which have a relative profile thickness, which is defined as the ratio of maximum cross-sectional thickness to chord length, of between 20% and 30%, and wherein the middle portion comprises a local minimum of the course of the lift coefficient.

The profile comprises a finite number of profile sections. A profile section corresponds in particular to the cross section of the rotor blade at any point in the longitudinal direction between the blade connector and the blade tip. This cross section is characterized in particular in that a surface orthogonal of said cross section is oriented substantially parallel to the longitudinal direction of the rotor blade.

A profile section can be characterized, for example, by means of the chord length, the profile thickness or the relative profile thickness, the relative thickness setback, the camber or the relative camber, the relative camber setback and the nose radius.

Furthermore, rotor blades are described by aerodynamic coefficients. The dimension-related forces and torques of a rotor blade are proportional to the square of the incident-flow speed, to the density of the fluid and to the wind blade area. In order to be able to better characterize the aerodynamic properties of various profiles, dimensionless aerodynamic coefficients are used. For this purpose, the forces are depicted dimensionless with the dynamic pressure and the area, and the torque additionally with the torque reference length. In the case of rotor blade profiles, the chord length T is selected as the torque reference length.

The most important aerodynamic coefficients are the lift coefficient, the drag coefficient and the torque coefficient. Owing to the dependences of said coefficients, in particular of the lift coefficient, on the angle of attack, said coefficients are dependent on the operating conditions. Owing thereto, in the design of rotor blades for wind turbines, a design lift coefficient has to be calculated in which the variable sizes during the operation of the rotor blade are selected as design constants. Consequently, the abovementioned lift coefficient, or the abovementioned lift coefficients of the rotor blade according to the first aspect, should preferably be understood as meaning the design lift coefficient or the design lift coefficients.

The rotor blade has a profile which is distinguished by different profile sections along the longitudinal direction of the rotor blade. One variable of said profile is the lift coefficient which has a course along the profile. The course of the lift coefficient is distinguished in particular by individual lift coefficients of differing magnitude.

In the middle portion, the profile of the lift coefficient comprises a local minimum. A profile section with a low lift coefficient can generally have a high lift-to-drag performance if it has a particularly low drag. In the event of good rotor power, the blade depth can be increased using such a profile and therefore the available structural construction space and the available structural construction depth are increased. As a result, for example, a greater polar drag torque in the supporting structure of the rotor blade can be realized. This leads to lighter and more rigid rotor blades. The rotor power which can be obtained is substantially not negatively influenced by the high lift-to-drag performance and the comparatively low lift coefficients in the range adjacent to the local minimum in the middle portion.

In the tip portion which is structurally loaded generally to a small extent, it is preferably provided that, for operating load reasons, the chord length is small in comparison to the middle portion and the power is achieved by high lift coefficients. In addition, in the tip portion, the soiling drag should be taken into consideration. Such profile properties for the tip portion can be achieved, inter alia, by shifting the thickness setback in the direction of the profile leading edge. The main increase in pressure of the flow around the profile thereby arises at an early point, and therefore overall a smaller negative pressure gradient has to be overcome by the flow. In this way, higher lifts can be achieved than with profiles having a higher thickness setback. The low proportion of laminar flow at such profiles results in a better profile power in the state in which there is a turbulent flow around them.

The middle portion has substantially profile sections which have a relative profile thickness of between 20% and 30%. The relative profile thickness is defined as the ratio of maximum cross-sectional thickness to chord length on a profile section. The relative profile thickness can be determined for each profile section along the longitudinal direction. The values for maximum cross-sectional thickness and chord length for determining a relative profile thickness are determined in each case for a profile section. This means in particular that the values for maximum cross-sectional thickness and chord length are determined for a span width coordinate. This means in particular that, for the determination of the relative profile thickness, no value of maximum cross-sectional thickness of a first profile section and a value of the chord length of a second profile section different from the first is used. The direction of the profile thickness and the profile chord are oriented substantially orthogonally to each other. Profile sections with a relative thickness of between 20% and 30% can permit high lift-to-drag performances. Furthermore, a high degree of rigidity in respect of forces and torques is made possible.

The fact that the middle portion has substantially profile sections having a relative profile thickness of between 20% and 30% means in particular that the middle portion can also have regions, in particular intermediate regions, which comprise profile sections with a relative profile thickness of less than 20% or more than 30%. Preferably, more than 80% or more than 90% or more than 95% of the middle portion has profile sections having a relative profile thickness of between 20% and 30%.

At the blade flange, there is generally a circular profile with a thickness setback of 50% and a relative thickness of 100%. This region is frequently adjoined by flatback profiles having a high relative thickness. In contrast to closed profiles, flatback profiles have a planar extent at the trailing edge. The planar extent of the trailing edge is advantageous since, owing to the relatively high thickness, the flow has to overcome a sharp negative pressure gradient which would be too large in the case of profiles having a closed rear edge, and therefore flow separation would occur.

A power- and load-optimal rotor blade has a lift-optimized hub portion and/or a tip portion, and a middle portion which comprises a local minimum of the profile of the lift coefficient, with the middle portion preferably being distinguished by a high lift-to-drag performance. As a result, a rotor blade can be provided which has a high efficiency and is structurally optimized. In particular, a greater chord length can be provided in the structurally highly loaded middle portion, as a result of which a higher profile thickness is made possible while keeping the relative profile thickness constant. The higher profile thickness and the greater chord length result in the possibility of undertaking a better structural design, for example the possibility of a higher bending drag torque and/or a higher polar drag torque.

The hub portion is adjacent to the blade connector. The abovementioned tip portion is adjacent to the blade tip. The term hub portion or the term tip portion is not restrictive. In particular, it should be understood as meaning a portion which is adjacent to the blade connector or to the blade tip, but the extent in the direction of the blade center is not restricted by the terms as such.

In a preferred development of the rotor blade, it is provided that the latter extends in the longitudinal direction with a course of a thickness setback, wherein the thickness setback of a profile section is defined as the ratio of the distance between the maximum cross-sectional thickness and a leading edge of the rotor blade in the direction of the profile chord to the chord length, wherein the middle portion comprises a local maximum of the thickness setback. The profile chord is defined in the profile section in particular in such a manner that the profile chord is the connecting line between the trailing edge, optionally between a center point of the trailing edge, and the front edge. The center point of the trailing edge is preferably the point on a flat trailing edge, for example a flatback profile, which has the same spacing from the pressure side and the suction side. The value of the length of the profile chord should be understood substantially as meaning the chord length.

The thickness setback is determined from the distance between the maximum cross-sectional thickness and the leading edge in relation to the chord length. The distance between the maximum cross-sectional thickness and the leading edge is determined in the direction of the profile chord. A profile section in the middle portion can have, for example, a chord length of 2 m (meters) such that the rotor blade extends at this profile section from the leading edge as far as the trailing edge with the chord length of 2 m. The maximum cross-sectional thickness can be spaced apart at this profile section from the leading edge by, for example, 70 cm. This distance from the leading edge is determined in the direction of the profile chord. From the ratio of maximum cross-sectional thickness of 70 cm to chord length of 2 m, this would result in a thickness setback of 0.35 for the profile section under consideration. This calculation is, of course, by way of example and can be transferred to all ratios of chord length and position of maximum cross-sectional thickness.

The absolute maximum of the thickness setback is generally in a portion in the vicinity of the hub, in particular in a portion which has a circular-cylindrical profile, wherein circular-cylindrical profiles have a thickness setback of 50%. Customarily, rotor blades have a substantially decreasing and/or constant course of the thickness setback. By means of an increase of the thickness setback in the middle portion, the region with a negative pressure gradient in the flow in the front part of the profile can be extended and, as a result, the proportion of low-friction laminar flow in the central portion can be increased. This leads to an improved lift-to-drag performance which can compensate for the reduced lift coefficients.

In a preferred development of the rotor blade, it is provided that the course of the thickness setback in the longitudinal direction between blade connector and blade tip is S-shaped, that is to say first of all comprises a local minimum and then the local maximum.

In a preferred development of the rotor blade, it is provided that the course of the thickness setback in the longitudinal direction has three turning points, wherein a first turning point lies in the range between 10% and 25% of the relative rotor blade length, and/or a second turning point lies in the range between 40% and 50% of the relative rotor blade length, and/or a third turning point lies in the range between 65% and 90% of the relative rotor blade length.

In a preferred development of the rotor blade, it is provided that the local minimum of the thickness setback is greater than 0.35, in particular greater than 0.4. Such values for thickness setbacks are unusual for rotor blades of wind turbines. It has surprisingly turned out that such values for thickness setbacks generate high lift-to-drag performances in the middle portion, and therefore a high rotor power can be obtained despite smaller lift coefficients.

According to a further preferred embodiment variant, it is provided that between 30% and 80% of a relative rotor blade length, the thickness setback is between 0.35 and 0.4. The relative rotor blade length is defined between 0% and 100%. 0% characterizes an end facing the hub, or an end which faces the blade connector or a rotor blade flange. 100% of the relative rotor blade length characterizes a blade tip. The span width of 0.35 to 0.4 for the thickness setback in the range of 30% to 80% of the relative rotor blade length is an unusually high value, but it has turned out that, with this range, a high rotor power and good structural designability of the rotor blade are surprisingly made possible.

According to a further preferred embodiment variant, it is provided that between 0% and 30% of the relative rotor blade length, the thickness setback is between 0.25 and 0.5, and wherein preferably the thickness setback decreases between 0% to 30% of the relative rotor blade length.

Furthermore, it can be provided that between 80% and 100% of the relative rotor blade length, the thickness setback is between 0.25 and 0.35, and wherein, between 80% to 100%, the thickness setback preferably comprises a local minimum.

In addition, it can be provided that between 0% and 40% of the relative rotor blade length, the rotor blade comprises a minimum of the thickness setback, wherein the minimum of the thickness setback is preferably smaller than 0.35, in particular smaller than 0.3. The minimum of the thickness setback can also preferably be provided between 20% and 40% of the relative rotor blade length, in particular between 25% and 35%.

In a particularly preferred embodiment variant of the rotor blade, it is provided that the hub portion extends between 0% and 30% of the relative rotor blade length, and/or the middle portion extends between 30% and 80% of the relative rotor blade length, and/or the tip portion extends between 80% and 100% of the relative rotor blade length.

It is preferred that the relative profile thickness of the rotor blade is between 15% and 100%. In a further preferred development of the rotor blade, it is provided that said rotor blade has a flatback profile at least in portions, wherein preferably the flatback profile is arranged in the hub portion.

Flatback profiles differ from the conventionally provided closed profiles. In particular, they differ from a closed profile at the trailing edge to the effect that they have a rectilinear trailing edge, and therefore the profile has a trailing edge of planar design and not a trailing edge of linear design. The longer increase in pressure makes it possible for larger pressure gradients to be overcome, and the height of the flattened trailing edge can be reduced such that the drag is reduced. Furthermore, such profiles can deliver higher lifts than conventional blade root profiles.

According to a further aspect, provided is a wind turbine having at least one rotor blade according to one of the above-described embodiment variants.

Furthermore, provided is a windfarm having at least two wind turbines according to the above aspect.

Furthermore, provided is a method for designing a rotor blade, which extends in the longitudinal direction with a profile from a blade connector to a blade tip, wherein the profile comprises a course of a lift coefficient, comprising a hub portion adjacent to the blade connector and a tip portion adjacent to the blade tip, a middle portion adjacent to the hub portion and to the tip portion, wherein, for the middle portion, essentially those profile sections are selected which have a relative profile thickness, which is defined as a ratio of maximum cross-sectional thickness to chord length, of between 20% and 30%, and wherein the course of the lift coefficient of the middle portion is selected in such a manner that it comprises a local minimum of the course of the lift coefficient.

The method and its possible developments have features and method steps which make them particularly suitable for using a rotor blade according to the first aspect and its developments. For further advantages, embodiment variants and embodiment details of the further aspects and of their possible developments, reference is also made to the previous description for the corresponding features and developments of the rotor blade.

BRIEF DESCRIPTION OF THE SEVERAL VIEWS OF THE DRAWINGS

Preferred exemplary embodiments will be explained by way of example with reference to the attached figures, in which.

DETAILED DESCRIPTION

Figure 1:
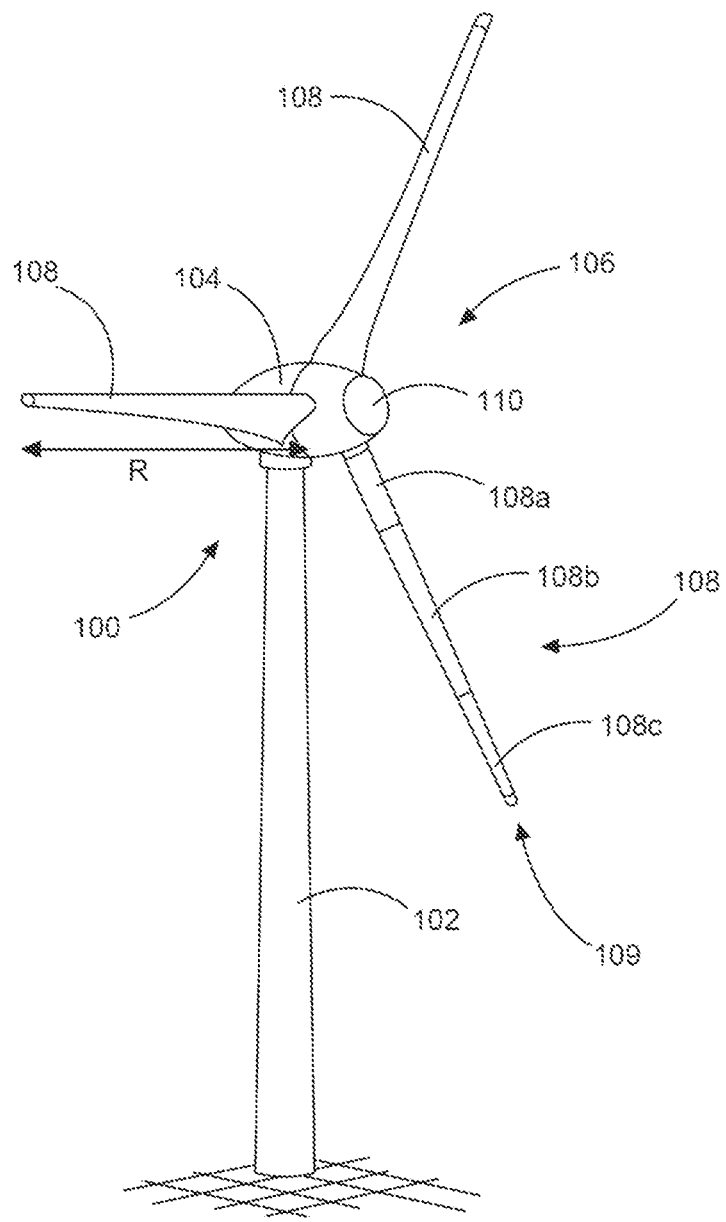
FIG. 1 shows a schematic three-dimensional view of an exemplary embodiment of a wind turbine.

FIG. 1 shows a schematic three-dimensional view of an exemplary embodiment of a wind turbine 100. The wind turbine 100 has a tower 102 and a nacelle 104 on the tower 102. An aerodynamic rotor 106 having three rotor blades 108, which each have a rotor blade length R, and a spinner 110 are provided on the nacelle 104. During operation of the wind turbine 100, the aerodynamic rotor 106 is set into a rotational movement by the wind and therefore also rotates an electrodynamic rotor or runner of a generator which is coupled directly or indirectly to the aerodynamic rotor 106. The electric generator is arranged in the nacelle 104 and generates electrical energy. The pitch angles of the rotor blades 108 can be changed by pitch motors at the rotor blade roots of the respective rotor blades 108.

The rotor blades 108 each have a hub portion 108a, a middle portion 108b and a tip portion 108c. The hub portion 108a faces a hub arranged on the nacelle 104. The tip portion 108c is the distal portion of the rotor blade 108 and faces away from the hub and the nacelle 104. The tip portion 108c extends from a blade tip 109 in the direction of the hub. The middle portion 108b is arranged between the hub portion 108a and the tip portion 108c.

The rotor blades 108 have a profile in the longitudinal direction. The profile sections therefore change over the longitudinal direction of a rotor blade. The profile is distinguished by a plurality of a lift coefficients. The relative thickness of the rotor blades 108 is between 20% and 30% in the respective middle portion 108b. The lift coefficients are smaller in the middle portion 108b than in the hub portion 108a and smaller than in the tip portion 108c. A lift coefficient is understood here as meaning a design lift coefficient.

Figure 2:
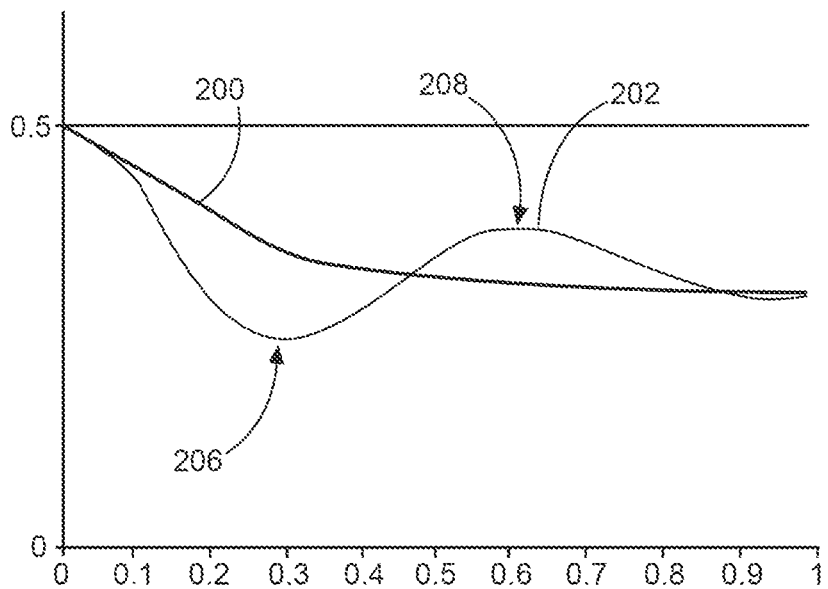
FIG. 2 shows schematic courses of thickness setbacks of a conventional rotor blade and of a rotor blade with a local minimum of the course of the lift coefficient in the middle portion.

FIG. 2 shows schematic courses of thickness setbacks of a conventional rotor blade and of a rotor blade with a local minimum of the plurality of the lift coefficients in the middle portion. On the abscissa, the relative rotor blade length is plotted between 0 and 1, or between 0% and 100%. The thickness setback is plotted on the ordinate.

The first course of a thickness setback 200 represents the course of a thickness setback of a conventional rotor blade. The thickness setback 200 of the conventional rotor blade decreases from 0.5 in the region close to the hub to a value of approx. 0.4 and is then virtually constant between 30% and 100% of the relative rotor blade length.

In contrast thereto, a course of a thickness setback 202 of a rotor blade changes to a more pronounced extent along the relative rotor blade length. In the region in the vicinity of the hub, i.e., in the hub portion 108a, the thickness setback is greatly reduced between 0% and 30% of the relative rotor blade length. At approx. 30% of the relative rotor blade length, the course of the thickness setback 202 comprises a minimum 206. From the minimum 206 at 30% of the relative rotor blade length, the course of the thickness setback 202 of the rotor blade 108 increases to a local maximum 208 at approx. 60% of the relative rotor blade length. From the maximum 208, which is at approx. 0.4, the course of the thickness setback 202 decreases between 60% and 90% of the relative rotor blade length. Between 90% and 100% of the relative rotor blade length, the course of the thickness setback 202 is substantially constant. At 90% of the relative rotor blade length, there is a local minimum of the course of the thickness setback 202.

In short, it can be seen that the course of the thickness setback 202 over the rotor blade length is S-shaped, that is to say initially comprises a local minimum 206 and then a local maximum 208 between blade connector and blade tip.

Figure 3:
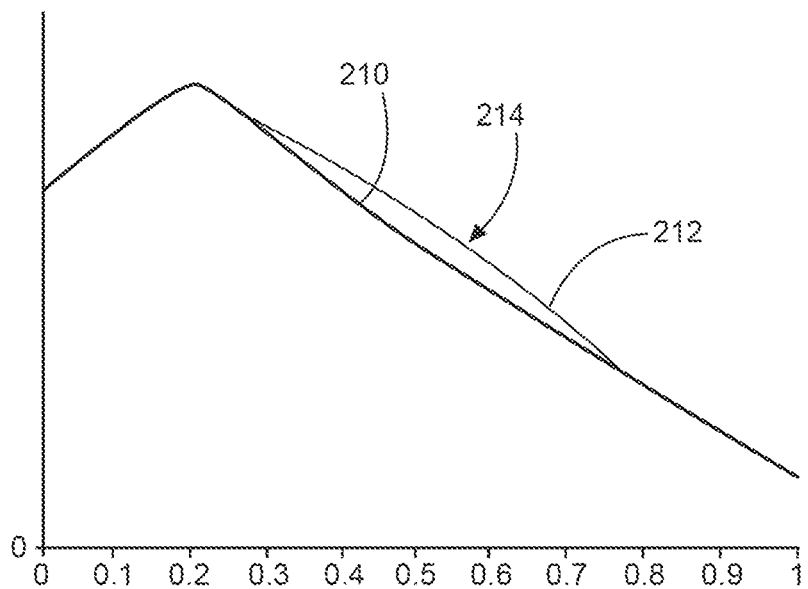
FIG. 3 shows schematic courses of blade depths of a conventional rotor blade and of a rotor blade with a local minimum of the course of the lift coefficient in the middle portion.

FIG. 3 shows schematic courses of blade depth of a conventional rotor blade and of a rotor blade 108 with a local minimum of the lift coefficient in the middle portion. On the abscissa, the relative rotor blade length of between 0 and 1, or between 0% and 100%, is also plotted here. The chord length of rotor blades is plotted qualitatively on the abscissa. The course of the chord length 210 represents the chord length of a conventional rotor blade. The course of the chord length 212 represents a course of a chord length of a rotor blade.

It is apparent that the chord length in a range 214 of between 30% and 80% of the relative rotor blade length is greater than in the case of conventional rotor blades. By means of the increased chord length 212 in the range 214, this rotor blade 108 can be provided with a greater profile thickness, with nevertheless a constant relative profile thickness being achieved. Owing thereto, the lift-to-drag performance of the rotor blade 108 in the middle portion 108b, in particular in the range 214, with the course of the chord length 212 can be improved.

Figure 4:
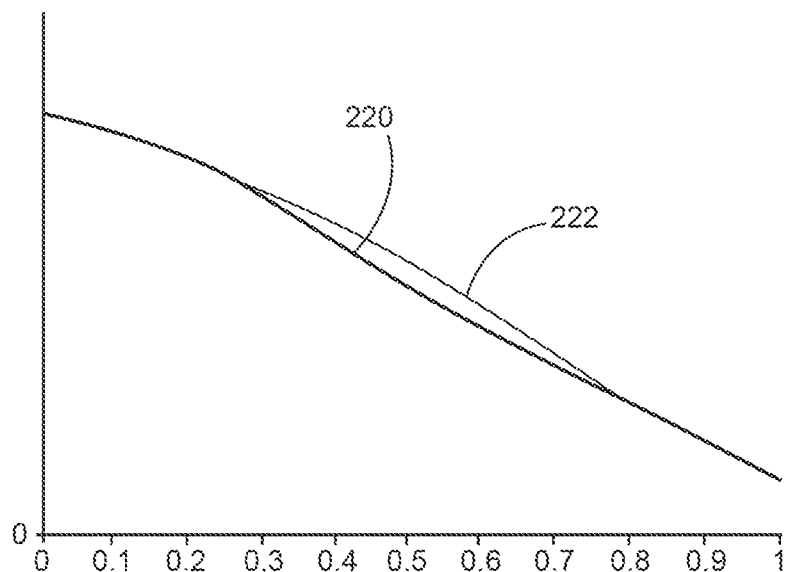
FIG. 4 shows schematic profiles of blade thicknesses of a conventional rotor blade and of a rotor blade with a local minimum of the profile of the lift coefficient in the middle portion.

FIG. 4 shows schematic courses of blade thicknesses of a conventional rotor blade and of a rotor blade 108 with a local minimum of the lift coefficient in the middle portion. On the abscissa, the relative rotor blade length of between 0 and 1, or between 0% and 100%, is also plotted here. The course of the blade thickness 220 represents the course of the blade thickness of a conventional rotor blade. The course of the blade thickness 222 represents the course of a rotor blade 108. It is apparent that the blade thickness 222 in a range of between 30% and 80% of the relative rotor blade length is greater than in the case of the conventional rotor blade. Consequently, with the greater chord length, shown in FIG. 3, in said rotor blade portion, a substantially consistent relative thickness can be achieved and nevertheless an increased lift-to-drag performance can be obtained.

Figure 5:
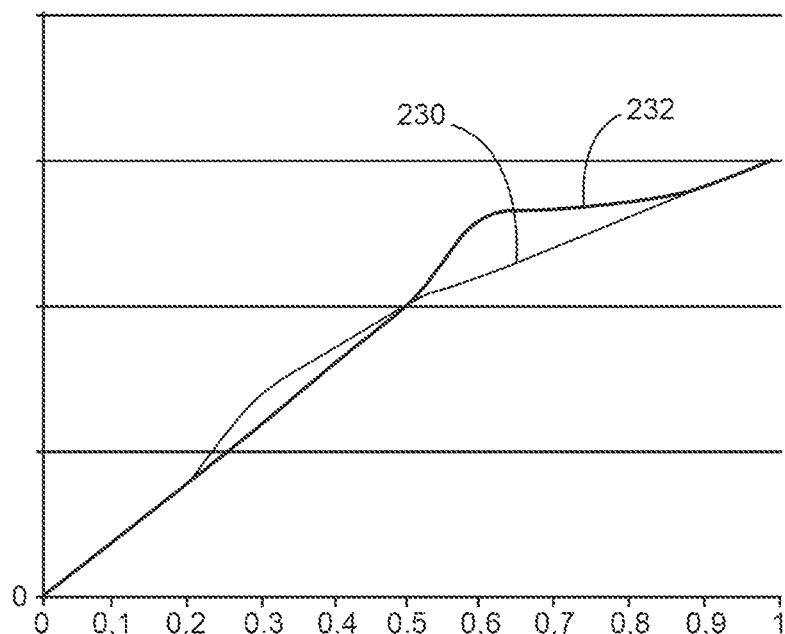
FIG. 5 shows schematic courses of lift-to-drag performances of a conventional rotor blade and of a rotor blade with a local minimum of the course of the lift coefficient in the middle portion.

FIG. 5 shows schematic courses of lift-to-drag performances of a conventional rotor blade and of a rotor blade 108 with a local minimum of the lift coefficient in the middle portion. On the abscissa, the relative rotor blade length of between 0 and 1, or between 0% and 100%, is again plotted. The lift-to-drag performance is plotted qualitatively on the ordinate. The profile of the lift-to-drag performance 230 represents the course of a lift-to-drag performance of a conventional rotor blade. The course of the lift-to-drag performance 232 represents the course of a lift-to-drag performance of a rotor blade 108.

It is apparent that the lift-to-drag performance 232 in two portions is significantly higher than the lift-to-drag performance of the conventional rotor blade. In particular in the range between 20% and 45% and between 50% and 80% of the relative rotor blade length, increases in the lift-to-drag performance can be achieved by a greater chord length, a greater profile thickness and a reduced lift coefficient being realized.

REFERENCE SIGNS

100 Wind turbine
102 Tower
104 Nacelle
106 Rotor
108 Rotor blades
109 Blade tip
110 Spinner
108a Hub portion
108b Middle portion
108c Tip portion
200 Course of a thickness setback
202 Course of a thickness setback
206 Minimum
208 Maximum
210 Course of a chord length
212 Course of a chord length
214 Range of greater chord length
220 Course of a blade thickness
222 Course of a blade thickness
230 Profile of a lift-to-drag performance (L/D)

232 Course of a lift-to-drag performance (L/D)
R Rotor blade length

The invention claimed is:
1. A rotor blade for a wind turbine, comprising:
a rotor blade body comprising:
   a blade connector;
   a blade tip; and
   a profile including a plurality of profile sections extending in a longitudinal direction from the blade connector to the blade tip, each profile section including a respective lift coefficient, a relative profile thickness, and a thickness setback,
wherein at each profile section, the relative profile thickness is defined as a ratio of a maximum cross-sectional thickness to a chord length,
wherein at each profile section, the thickness setback is defined as a ratio of (i) a distance along the chord length from a leading edge of the profile to the maximum cross-sectional thickness to (ii) the chord length,
wherein the plurality of profile sections is divided into groups of profile sections including a hub portion adjacent to the blade connector, a tip portion adjacent to the blade tip, and a middle portion between the hub portion and the tip portion,
wherein the profile sections in the middle portion include a relative profile thickness between 20% and 30%,
wherein the profile further includes a local minimum lift coefficient and a local maximum thickness setback each arranged in the middle portion, and
wherein a minimum thickness setback of the profile is arranged between 0% and 40% of a rotor blade length measured from the blade connector toward the blade tip.

2. The rotor blade as claimed in claim 1, wherein the thickness setback of each profile section is arranged along the profile so as to collectively form an S-shape including a local minimum thickness setback and the local maximum thickness setback.

3. The rotor blade as claimed in claim 2, wherein the S-shape includes first, second, and third turning points, wherein:
   the first turning point is arranged between 10% and 25% of the rotor blade length measured from the blade connector toward the blade tip, and/or
   the second turning point is arranged between 40% and 50% of the rotor blade length measured from the blade connector toward the blade tip, and/or
   the third turning point is arranged between 65% and 90% of the rotor blade length measured from the blade connector toward the blade tip.

4. The rotor blade as claimed in claim 2, wherein the local minimum thickness setback is greater than 35%.

5. The rotor blade as claimed in claim 4, wherein the local minimum thickness setback is greater than 40%.

6. The rotor blade as claimed in claim 1, wherein the middle portion extends between 30% and 80% of the rotor blade length measured from the blade connector toward the blade tip, and
   wherein the profile sections in the middle portion include a thickness setback between 35% and 40%.

7. The rotor blade as claimed in claim 1, wherein the hub portion extends between 0% and 30% of the rotor blade length measured from the blade connector toward the blade tip, and
   wherein the profile sections in the hub portion include a thickness setback between 25% and 50%.

8. The rotor blade as claimed in claim 7, wherein the profile sections in the hub portion are arranged such that the thickness setbacks decrease in a direction from the blade connector toward the blade tip.

9. The rotor blade as claimed in claim 1, wherein the tip portion extends between 80% and 100% of the rotor blade length measured from the blade connector toward the blade tip,
   wherein the profile sections in the tip portion include a thickness setback between 25% and 35%, and
   wherein the profile further includes a local minimum thickness setback arranged in the tip portion.

10. The rotor blade as claimed in claim 1, wherein:
    the hub portion extends between 0% and 30% of the rotor blade length measured from the blade connector toward the blade tip, and/or
    the middle portion extends between 30% and 80% of the rotor blade length measured from the blade connector toward the blade tip, and/or
    the tip portion extends between 80% and 100% of the rotor blade length measured from the blade connector toward the blade tip.

11. The rotor blade as claimed in claim 1, wherein the relative profile thickness of each profile section is between 15% and 100%.

12. The rotor blade as claimed in claim 1, wherein at least a portion of the plurality of profile sections includes a flatback profile.

13. The rotor blade as claimed in claim 12, wherein the flatback profile is arranged in the hub portion.

14. The rotor blade as claimed in claim 1, wherein the minimum thickness setback is less than 35%.

15. The rotor blade as claimed in claim 14, wherein the minimum thickness setback is less than 30%.

16. A wind turbine comprising a tower, a rotor, and at least one rotor blade as claimed in claim 1 coupled to the rotor.

17. A windfarm comprising at least two wind turbines as claimed in the claim 16.

* * * * *